(12) United States Patent
Jiao et al.

(10) Patent No.: US 11,623,728 B2
(45) Date of Patent: Apr. 11, 2023

(54) AEROSPACE INTELLIGENT WINDOW SYSTEM

(71) Applicant: PPG Industries Ohio, Inc., Cleveland, OH (US)

(72) Inventors: Yu Jiao, Blawnox, PA (US); Nicolas B. Duarte, Allison Park, PA (US); Monroe A. Stone, Gurley, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 387 days.

(21) Appl. No.: 17/022,556

(22) Filed: Sep. 16, 2020

(65) Prior Publication Data

US 2021/0206466 A1 Jul. 8, 2021

Related U.S. Application Data

(60) Continuation of application No. 15/924,800, filed on Mar. 19, 2018, now Pat. No. 10,807,695, which is a division of application No. 13/950,599, filed on Jul. 25, 2013, now Pat. No. 9,919,787.

(60) Provisional application No. 61/678,315, filed on Aug. 1, 2012.

(51) Int. Cl.
    *B64C 1/14* (2006.01)
    *B64D 45/00* (2006.01)

(52) U.S. Cl.
    CPC .......... *B64C 1/1484* (2013.01); *B64C 1/1476* (2013.01); *B64C 1/1492* (2013.01); *B64D 2045/0085* (2013.01)

(58) Field of Classification Search
    CPC . B64D 2045/0085; B64F 5/60; B64C 1/1484; B64C 1/1476; B64C 1/1492

USPC ...................................... 701/34.4; 244/129.3
See application file for complete search history.

(56) References Cited

U.S. PATENT DOCUMENTS

| | | | |
|---|---|---|---|
| 4,610,771 A | 9/1986 | Gillery | |
| 4,744,809 A | 5/1988 | Pecoraro et al. | |
| 4,806,220 A | 2/1989 | Finley | |
| 5,383,133 A * | 1/1995 | Staple | G01H 1/00 340/963 |

(Continued)

FOREIGN PATENT DOCUMENTS

| | | |
|---|---|---|
| RU | 2381954 C2 | 2/2010 |
| WO | 2010077507 A2 | 7/2010 |

*Primary Examiner* — Christopher D Hutchens

(57) ABSTRACT

A network system for monitoring and storing data of aircraft intelligent windows or windshields to provide useable life of, provide real life performance of, and/or measure characteristics and/or properties of, the windshields forwards the data from sensors mounting the windshield to a window sensing hub having a microprocessor programed to receive and process the data to determine the performance of the windshield and formatting the data in accordance to a preset program, wherein the program includes providing data from the sensors that measures characteristics and properties of the windshield that are active during the period in which the data is taken. An aircraft central maintenance system connected to the window sensing hub receives the formatted information from the window sensing hub and unfiltered or unformatted information, wherein the unfiltered information from the windshield is acted on by the central maintenance system to provide an estimated useable life of the windshield.

19 Claims, 6 Drawing Sheets

(56) References Cited

U.S. PATENT DOCUMENTS

| | | |
|---|---|---|
| 5,675,944 A | 10/1997 | Kerr et al. |
| 5,821,001 A | 10/1998 | Arbab et al. |
| 6,094,942 A | 8/2000 | Falleroni et al. |
| 6,490,543 B1 | 12/2002 | Jaw |
| 6,747,780 B2 | 6/2004 | Xu et al. |
| 7,450,294 B2 | 11/2008 | Weidner |
| 7,509,537 B1 | 3/2009 | Jensen et al. |
| 7,586,664 B2 | 9/2009 | O'Shaughnessy |
| 8,064,120 B2 | 11/2011 | Callahan et al. |
| 8,084,120 B2 | 12/2011 | Hill et al. |
| 8,155,816 B2 | 4/2012 | Rashid et al. |
| 8,383,994 B2 | 2/2013 | Rashid et al. |
| 2002/0113168 A1 | 8/2002 | Rukavina et al. |
| 2003/0065428 A1* | 4/2003 | Mendelson .......... G05D 1/0055 701/9 |
| 2006/0004499 A1* | 1/2006 | Trego ................. B64F 5/60 701/31.4 |
| 2008/0042012 A1 | 2/2008 | Callahan et al. |
| 2008/0191841 A1 | 8/2008 | Fourreau |
| 2008/0239451 A1 | 10/2008 | Mitchell et al. |
| 2009/0265118 A1 | 10/2009 | Guenther et al. |
| 2010/0106430 A1* | 4/2010 | Balestra ............. G01M 13/02 702/35 |
| 2010/0163675 A1 | 7/2010 | Rashid et al. |
| 2010/0168935 A1 | 7/2010 | Rashid et al. |
| 2012/0173438 A1 | 7/2012 | Rashid et al. |
| 2013/0075531 A1 | 3/2013 | Jiao et al. |

* cited by examiner

AEROSPACE INTELLIGENT WINDOW SYSTEM

BACKGROUND OF THE INVENTION

1. Field of the Invention

This invention relates to an aerospace intelligent window system that includes performance data of one or more currently mounted windows in an aircraft (present performance data), and performance data of one or more previously mounted windows in the same aircraft and/or other aircrafts (past performance data) wherein the present and/or past performance data is used to determine life expectance of the one or more currently mounted windows.

2. Presently Available Technology

The present technology relating to sensors for aircraft windows, e.g. an aircraft windshield provides for mounting one or more sensors on an aircraft window and connecting the sensor output to a monitoring system mounted on the aircraft to provide instant performance data of selected properties or characteristics of the window. For a detailed discussion of sensors monitoring performance of selected properties and/or characteristics of aircraft windows reference is directed to U.S. Patent Application Publication Nos. 2010/0163675 A1, and 2013/075,531A1. The sensors, e.g. an impact sensor, a rupture sensor, an arc sensor, a temperature sensor and/or a moisture sensor, mounted on the aircraft window provide information relating to the performance of the window to determine if the performance is operating within acceptable limits. When the window performance is outside of acceptable limits, the window is repaired or replaced, e.g. as disclosed in U.S. Pat. No. 8,155,816 B2. U.S. Pat. No. 8,155,816 B2, and U.S. Patent Application Publication Nos. 2010/0163675 A1 and 2013/075,531A1 in their entirety are hereby incorporated by reference.

Although the present system to monitor performance of an aircraft window is acceptable, there are limitations. More particularly, one limitation of the presently available systems is that the data from the sensors provide information regarding actual performance of the aircraft window, e.g. but not limited to an aircraft windshield but little, if any, information regarding the useable life or life expectancy of the aircraft window. Another limitation of the present system is that the data is presented as information for each aircraft window as a separate unit, and the interaction between aircraft windows is not fully taken into account. As can now be appreciated by those skilled in the art, it would be advantageous to consider interconnect output of the sensors of aircraft windows mounted in the body of an airplane to form a network of windows. In this manner the performance of the network of windows can be monitored, and the present and past performance of the network of windows of the aircraft can be considered to determine useable life or life expectance of the windows of the network of windows and determine if the window failure is a result of the window construction or an indication that a portion of the aircraft body and/or the window mount surrounding the aircraft window is causing the window to perform outside of an acceptable range.

SUMMARY OF THE INVENTION

This invention relates to a network system for monitoring and storing performance data of a transparency to provide estimated useable life of the transparency and/or to provide real life performance of the transparency. The transparency includes but is not limited to a transparent sheet having a sensor group secured on a surface of the sheet to measure predetermined characteristics and/or properties of the transparency, wherein the sensor group includes, but is not limited to at least one sensor selected from the family of sensors including, but not limited to an arc sensor for measuring arcing of an electrically heatable member mounted on a surface of the transparent sheet, hereinafter referred to as an "arc sensor"; a heat sensor for measuring temperature of the heatable member, hereinafter referred to as a "heat sensor"; a moisture sensor for measuring moisture content on a surface of the transparent sheet, hereinafter referred to as a "moisture sensor"; an impact sensor for measuring force of impact of objects hitting a surface of the transparent sheet, hereinafter referred to as an "impact sensor", and a sensor for identifying fractures in and/or on the transparent sheet, hereinafter referred to as a "crack sensor".

The network system includes, but is not limited to a window sensing hub comprising a microprocessor to receive output of each of the sensor group of each of the transparencies, wherein the microprocessor is programed to receive data from the sensor group of the transparency providing information on the performance of the property and characteristic of the transparency associated with the sensor group and formatting the received data in accordance to a preset program, wherein the program includes at least providing data from the sensor group of the transparent sheet that measure characteristics and properties of the transparency that are active during the period in which the data taken is of interest, and a central maintenance system connected to the window sensing hub to receive the formatted information from the window sensing hub and unfiltered information, wherein the unfiltered information from the transparent sheet is acted on by the central maintenance system to provide an estimated useable life of the transparency.

This invention further relates to a transparency network inspection system, including, but not limited to a plurality of transparencies, each transparency comprising a pair of sheets laminated together and a sensor group to measure predetermined characteristics and/or properties of the transparency, wherein the sensor group comprises at least one sensor selected from the family of sensors comprising an arc sensor for measuring arcing of an electrically heatable member; a heat sensor for measuring temperature of the heatable member; a moisture sensor for measuring moisture content between the sheets of the transparency, an impact sensor for measuring force of impact of objects hitting outer surface of the transparency, and a fracture sensor for identifying fractures in a sheet of the transparency, and a central monitoring system comprising a microprocessor to receive output of each of the sensor group of each of the transparencies, wherein the microprocessor is programed to receive data from the sensor group of each transparency providing information on the performance of the property and characteristic of the transparency associated with the sensor group and formatting the received data in accordance to a preset program, wherein the program includes at least providing data from sensors that measure characteristics and properties of the transparency that are active during the period in which the data taken is of interest, and to act on the formatted information and unfiltered information to provide an estimated useable life of the transparency.

DETAILED DESCRIPTION OF THE INVENTION

Figure 1:
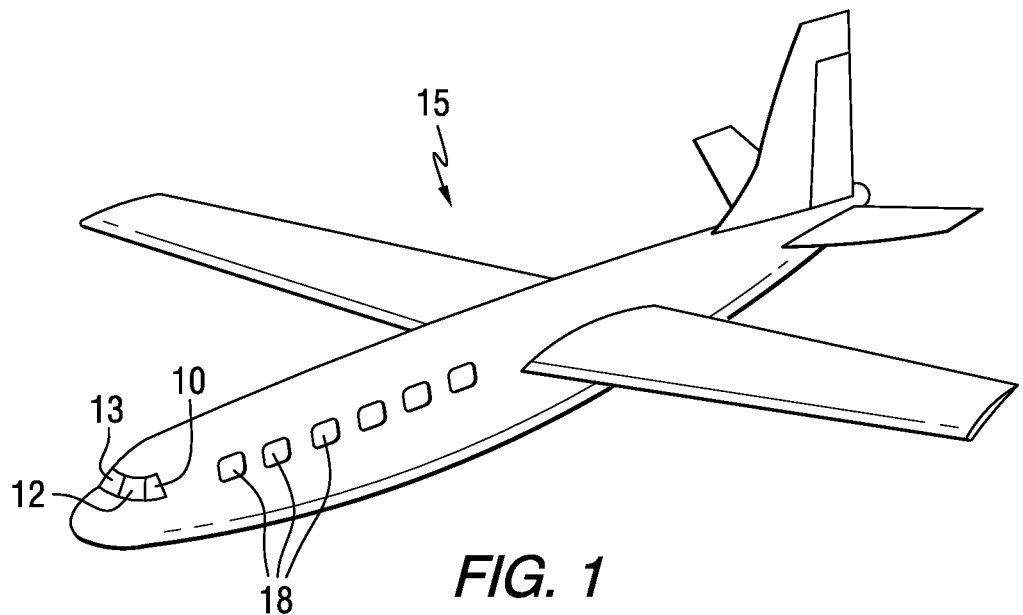
FIG. 1 is an isometric view of an aircraft that can be used in the practice of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "applies over", "deposited over", or "provided over" mean formed, applied, deposited, or provided on but not necessarily in contact with the surface. For example, a coating layer "formed over" a substrate does not preclude the presence of one or more other coating layers or films of the same or different composition located between the formed coating layer and the substrate.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements. The non-limited embodiments of the invention discussed herein are directed to an intelligent window system for a vehicle, e.g. but not limited to an aircraft windshield that includes, among other things, a plurality of windows; selected ones of the plurality of windows having one or more sensors to monitor the performance of properties of the window, and an aircraft central monitoring system (hereinafter also referred to as an aircraft "CMS", or an "ACMS") to receive data from the sensors to estimate useable life of the selected ones of the plurality of windows having a sensor.

With reference to FIG. 1, non-limiting embodiments of the invention will be directed to an aircraft laminated transparency, e.g. but not limited to a right side windshield 10, a left side windshield 11 (numbered but not shown in FIG. 1), a right front windshield 12, and a left front windshield 13, of aircraft 15. The invention, however, is not limited to any particular type of aircraft transparency, and the invention contemplates the practice of the invention on aircraft cabin windows 18, e.g. but not limited to aircraft windows of the type having a medium responsive to electric stimuli to increase or decrease visible transmission, e.g. but not limited to the type of window disclosed in U.S. Published Patent application 2007/0002422A1 and on aircraft windows of the type having an insulated air space between a pair of laminated sheets. The entire disclosure of U.S. Published Patent Application No. 2007/0002422A1 is hereby incorporated by reference. Further, the invention can be practiced on commercial and residential windows, e.g. but not limited to types disclosed in U.S. Pat. No. 5,675,944, which patent in its entirety is hereby incorporated by reference; a window for any type of land vehicle; a canopy, and windshield for any type of air and space vehicle, a window for any above or below water vessel, and a window for a viewing side or door for any type of containers, for example but not limited to a refrigerator, cabinet and/or oven door.

Figure 2:
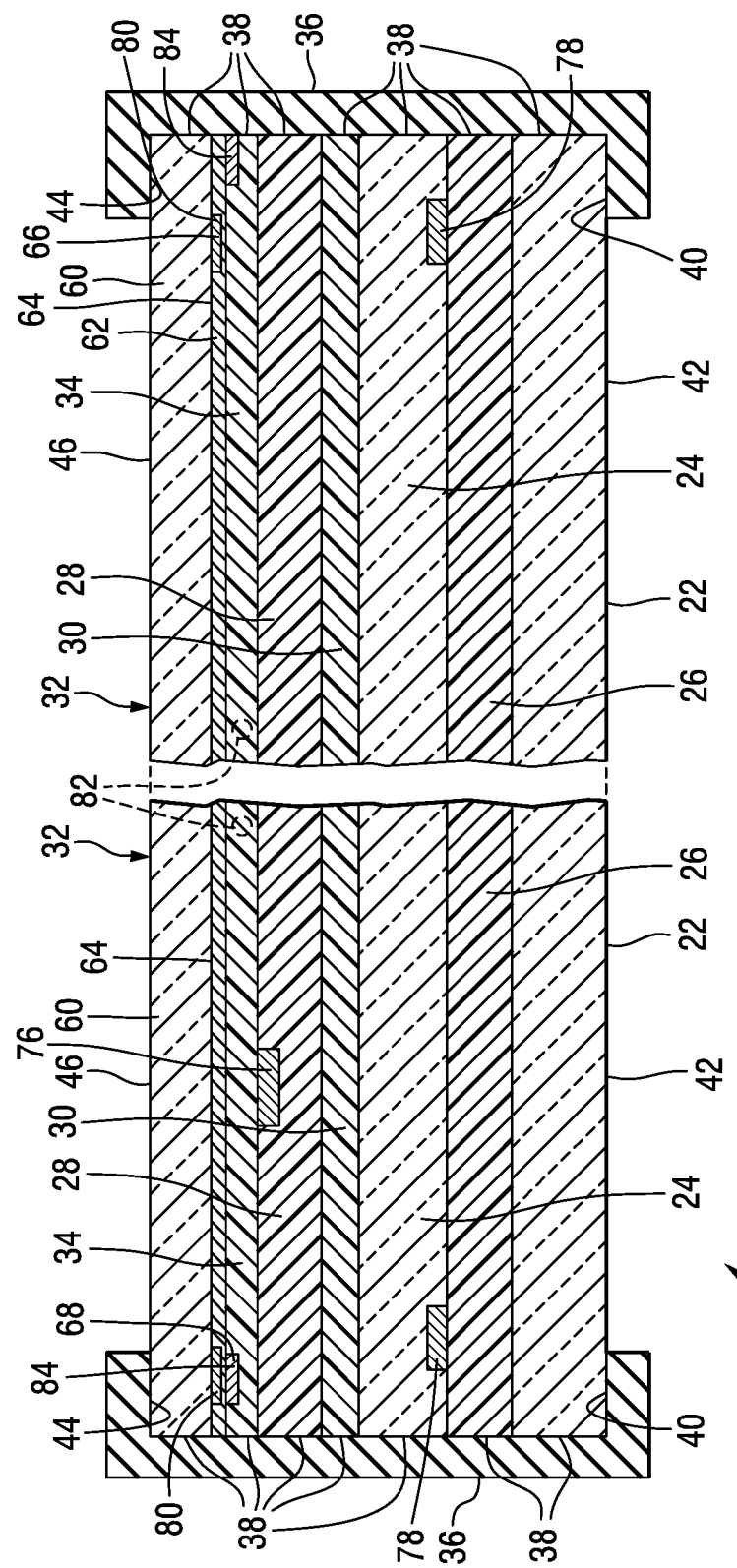
FIG. 2 is a cross sectional view of a non-limiting embodiment of an aircraft intelligent window used in the practice of the invention.

Shown in FIG. 2 is a non-limiting embodiment of an aircraft intelligent window (hereinafter also referred to as "AIW") 20, e.g. but not limited to a laminated aircraft windshield 20 that can be used in the practice of the invention. The AIW or windshield 20 includes a first glass sheet 22 secured to a second glass sheet 24 by a first interlayer 26; the second sheet 24 secured to a second vinyl-interlayer or sheet 28 by a first urethane interlayer 30, and the second vinyl-interlayer 28 secured to a heatable member 32 by a second urethane interlayer 34. An edge member or moisture barrier 36 of the type used in the art, e.g. but not limited to a silicone rubber or other flexible durable moisture resistant or impervious material is secured to (1) peripheral edge 38 of the windshield 20, i.e. the peripheral edge 38 of the first and second sheets 22, 24; of the first and second vinyl-interlayers 26, 28; of the first and second urethane interlayers 30, 34 and of the heatable member 32; (2) margins or marginal edges 40 of outer surface 42 of the windshield, i.e. the margins 40 of the outer surface 42 of the first glass sheet 22 of the windshield 20, and (3) margins or marginal edges 44 of outer surface 46 of the windshield 20, i.e. margins of the outer surface 46 of the heatable member 32.

As is appreciated by those skilled in the art, and not limiting to the invention, the first and second glass sheets 22, 24; the first and second vinyl-interlayers 26, 28 and the first urethane interlayer 30 form the structural part, or inner segment, of the windshield 20 and the outer surface 42 of the windshield 20 faces the interior of the aircraft 14, and the second urethane layer 34 and the heatable member 32 form the non-structural part, or outer segment, of the windshield 20, and the surface 46 of the windshield 20 faces the exterior of the aircraft 15. The heatable member 32 provides heat to remove fog from, and/or to melt ice on, the outer surface 46 of the windshield 20.

The invention is not limited to the construction of the AIW or windshield 20 and any of the constructions of aircraft transparencies used in the art can be used in the practice of the invention. For example and not limiting to the invention, the windshield 20 can include a construction wherein the vinyl interlayer 28 and the urethane interlayer 30 are omitted, and/or the sheets 22 and 24 are plastic sheets.

Further, the invention is not limited to the design and/or construction of the heatable member 32, and any electrically conductive heatable member used in the art to heat a surface of a sheet to melt ice on, and/or remove fog from the surface of the sheet can be used in the practice of the invention. In general, the heatable member 32 includes a glass sheet 60 having a conductive coating 62 applied to surface 64 of the glass sheet 60, and a pair of spaced bus bars 66, 68 in electrical contact with the conductive coating 62. The invention is not limited to the composition of the conductive coating 62, for example and not limiting to the invention the conductive coating 62 can be made from any suitable electrically conductive material. Non-limiting embodiments of conductive coatings that can be used in the practice of the invention include, but are not limited to, a pyrolytic deposited fluorine doped tin oxide film of the type sold by PPG Industries, Inc. under the registered trademark NESA; a magnetron sputter deposited tin doped indium oxide film of the type sold by PPG Industries, Inc. under the registered trademark NESATRON; a coating made up of one or more magnetron sputter deposited films, the films including, but not limited to a metal film, e.g. silver between metal oxide films, e.g. zinc oxide and/or zinc stannate, each of which may be applied sequentially by magnetron sputtering, e.g. as disclosed in U.S. Pat. Nos. 4,610,771; 4,806,220 and 5,821,001, the disclosures of which in their entirety are hereby incorporated by reference. The invention also contemplates a heatable member 32 using spaced electrically conductive wires. Heatable members to remove ice and snow from the aircraft windshield are well known in the art, and no further discussion is deemed necessary.

Generally the glass sheets 22, 24 and 60 of the windshield 20 are clear chemically strengthened lithium containing glass sheets; however, the invention is not limited thereto, and the glass sheets can be heat strengthened or heat tempered conventional soda-lime-silicate glass or borosilicate glass sheets. Further as is appreciated, the invention is not limited to the number of glass sheets, vinyl interlayers or urethane interlayers that make up the windshield 20 and the windshield 20 can have any number of sheets and/or interlayers.

Still further, the invention is not limited to the construction of the windshield 20 and any of the constructions of aircraft transparencies used in the art can be used in the practice of the invention. For example and not limiting to the invention, the windshield 20 can include a construction wherein the second vinyl-interlayer 28 and the first urethane interlayer 30 are omitted, and/or the glass sheets 22 and 24 are plastic sheets. Further, the cross section of the window 20 shown in FIG. 1 shows flat or non-shaped sheets, the invention is not limited thereto, and the window 20 can have a contour to match the contour of the outer surface of the aircraft in which the window is mounted, e.g. the aircraft 15 shown in FIG. 1.

In addition, the invention is not limited to the material of the layers or sheets of the transparency, and the layers or sheets can be made of, but not limited to, cured and uncured plastic sheets; annealed, heat strengthened, and heat and chemically strengthened, clear, colored, coated and uncoated glass sheets. Still further the invention can be practiced on windows having opaque sheets, e.g. but not limited to wood and metal sheets, and glass sheets having an opaque coating, and combinations thereof. In the preferred practice of the invention, the sheets 22, 24 and 60 are transparent clear glass sheets. By "clear glass" is meant non-tinted or non-colored glass. The glass sheets can be conventional float glass, and can be of any composition having any optical properties, e.g., any value of visible transmission, ultraviolet transmission, infrared transmission, and/or total solar energy transmission. By "float glass" is meant glass formed by a conventional float process. Examples of float glass processes are disclosed in U.S. Pat. Nos. 4,744,809 and 6,094,942, which patents in their entirety are hereby incorporated by reference.

In the preferred practice of the invention, the AIW or the windshield 20 has one or more sensors to monitor one or more properties of the window to determine if the window is operating within an acceptable performance range, and to take appropriate action based on the performance of the window as indicated by the sensor. In one non-limiting embodiment of the invention, the sensors are selected from the group of (A) an impact sensor 76 that generates a signal when an object hits or impacts the windshield, e.g. but not limiting to the invention, hits the outer surface 46 of the windshield 20 during takeoff; (B) a rupture or crack detector, or sensor 78 that generates a signal when a portion of the sheet cracks; (C) an arc sensor 80 which generates a signal indicating that the heatable member is arcing which indicates that the heatable member 32 has or is developing a defect; (D) a sensor or detector 82 to measure the temperature of the conductive coating 62 of the heatable member 32 to prevent over heating of the heatable member 32, and (E) a moisture sensor 84 to indicate moisture penetration through or around the moisture seal 36 and/or between the sheets of the laminated windshield.

The term "aircraft intelligent window" as used herein is an aircraft window having one or more sensors or detectors to measure performance of a property or characteristic of the window and forward a signal having the data to a processor.

The impact sensor 76, the rupture and crack sensor 78, the arc sensor 80, the temperature measuring sensor 82 and the moisture sensor 84 are shown in FIG. 2 as blocks without showing specific designs, components and/or operation of the sensors because the invention is not limited to the design or operation of the sensors 76, 78, 80, 82 and 84, and sensors well known in the art can be used in the practice of the invention, e.g. sensors that can be used in the practice of the invention are disclosed in detail in U.S. Pat. No. 8,155,816 B2, and U.S. Patent Application Publication Nos. 2010/0163675 A1 and 2013/075,531, and no further discussion is deemed necessary.

Non-limiting embodiments of the invention will be discussed using the right side windshield 10, the left side windshield 11, the right front windshield 12, and the left front windshield 13, of the aircraft 15. As can be appreciated, each of the right side windshield 10, the left side windshield 11, the right front windshield 12, and the left front windshield 13, of the aircraft 15 can have the design of the windshield 20 shown in FIG. 2 and discussed above, or selected ones of the right side windshield 10, the left side windshield 11, the right front windshield 12, and the left front windshield 13, of the aircraft 15 can have the design of the windshield 20 and the remaining ones of the right side windshield 10, the left side windshield 11, the right front windshield 12, and the left front windshield 13, of the aircraft 15 can have different designs, e.g. but not limited any prior art design of an aircraft windshield.

The discussion is now directed to non-limiting embodiments of aircraft window sensing networks (hereinafter also referred to as "AWSN") of the invention to receive input from selected ones of the sensors 76, 78, 80, 82 and 84 of the aircraft intelligent windows or windshields 10-13, and compare the present output of the sensors to previous output of the sensors and/or the output from different sensors of different windows measuring the same parameter to estimate life expectance or remaining useable life of the aircraft intelligent window for each of the properties measured by the sensors. In the preferred practice of the invention, the aircraft intelligent windshields 10-13 are considered windshields of an aircraft window sensing network (hereinafter also referred to as "AWSN") discussed in detail below instead of individual independent operating windshields. In this manner, individual performance of the windshields can be considered, and performance of the windshield operating as a windshield of a network can be considered. As will be appreciated, monitoring a network of windows instead of one window may provide information to indicate that the aircraft opening or window mount may be contributing to a window defect, or the design of the window may be useable for one location but not for a different location. By way of illustration and not limiting to the discussion, if past performance and present performance of a window in a network of windows that usually develops defects, e.g. moisture penetration is in "position x" of the aircraft, the type of failure of the windows (moisture penetration) in "position x" may be an indication that a window design is not useable in "position x".

In the preferred practice of the non-limiting embodiments of the invention, the sensor 76 provides data relating to impacts to the windshield; the sensor 78 provides data relating to the presence of cracks in the glass and plastic sheets; the sensor 80 provides data relating to arcing of the heatable member 32; the sensor 82 provides data relating to the temperature of the heatable member 32, and the sensor 84 provides data relating to moisture penetration. The sensors used in the practice of the invention include, but are not limited to the sensors and detectors disclosed in U.S. Patent Application Publication Nos. 2010/0163675 A1, and 2013/075531.

In one non-limiting embodiment of the invention, each of the aircraft intelligent windows monitored have the same sensors, and in another non-limiting embodiment of the invention, the aircraft intelligent windows have sensors that measure a property that is expected to be effected by the continued operation of the aircraft having the aircraft intelligent window. By way of illustration and not limiting to the invention, aircraft intelligent windows at the rear of the aircraft may not have impact sensors because impacts to the windows at the rear of the plane are less likely to have impacts during takeoff and landings than the front windshields of the aircraft. The sensors mounted on the aircraft intelligent window are collectively referred to as a group of sensors or sensor group.

Figure 3:
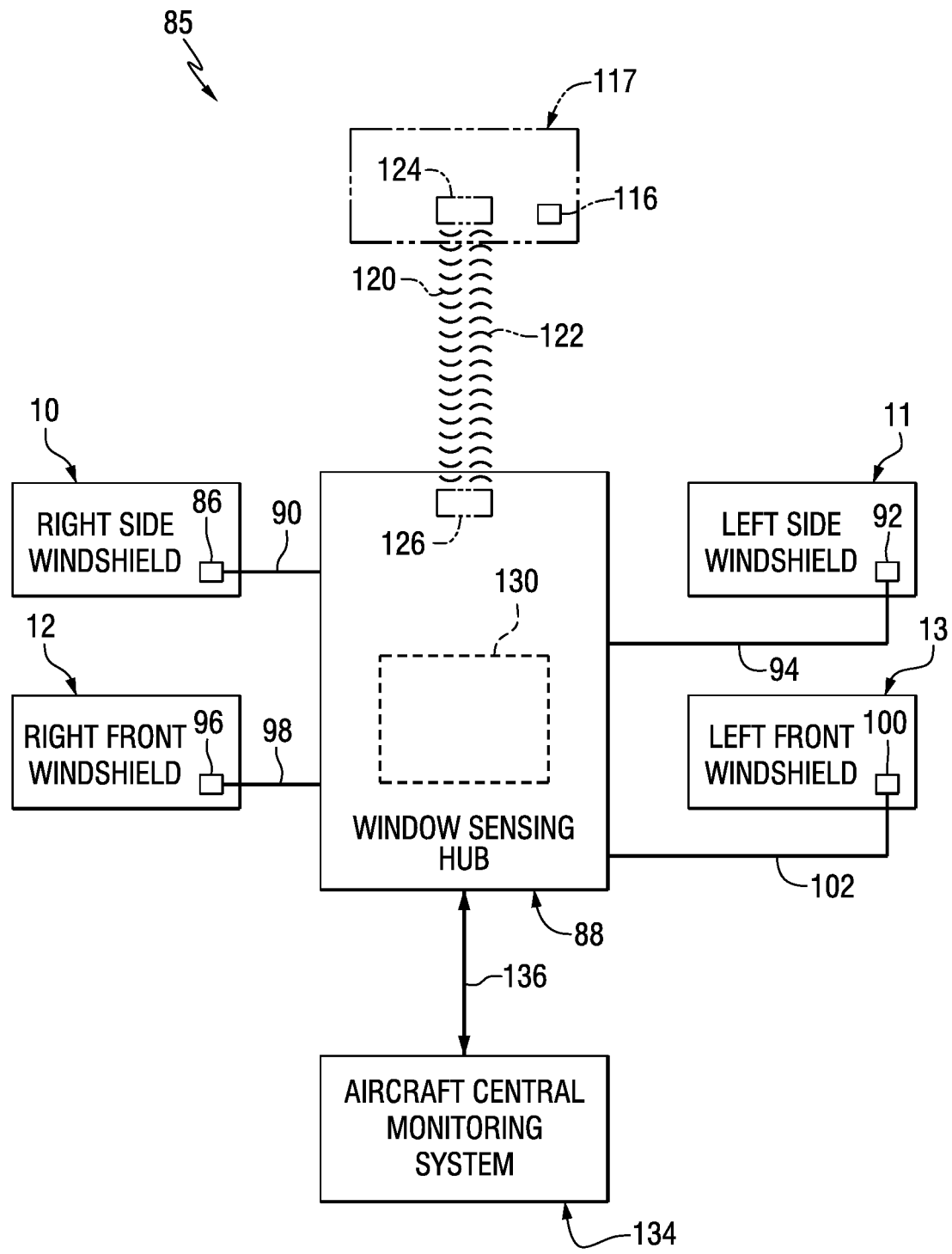
FIG. 3 is a non-limiting embodiment of a schematic of a network of aircraft intelligent windows of the invention.

Shown in FIG. 3 is a non-limiting embodiment of an aircraft window sensing network or AWSN 85 of the invention. The AWSN 85 includes, but is not limited to the right side windshield 10 having sensor group 86 connected to a window sensing hub ("WSH") 88 by way of cable 90; the left side windshield 11 having sensor group 92 connected to the WSH 88 by way of cable 94; the right front windshield 12 having sensor group 96 connected to the WSH 88 by way of cable 98; the left front windshield having sensor group 100 connected to the WSH 88 by way of cable 102, and AIW 117 having sensor group 116. The communication between the WSH 88 and the sensor groups 86, 92, 96 and 100 of the AIWs 10-13, respectively, is provided by cables 90, 94, 98 and 102, respectively, and the sensor group 116 of the windshield 117 is connected to the WSH 88 by a transmitter and antenna combination 124 mounted on the windshield 117, and a transmitter and antenna combination 126 is positioned in the WSH 88.

As can now be appreciated by those skilled in the art, passing information between the sensor groups 86, 92, 96, 100, and 116, and the WSH 88 can be by wireless transmission as shown for windshield 117 or can be by wire or cable transmission as shown for the AIWs 10-13 as discussed above. Wireless communication and wire communication to pass information between two or more locations or positions is well known in the art and no further discussion is deemed necessary. For additional discussion directed to wireless communication and wire communication to pass information between two or more locations, reference to U.S. Published Patent Publication No 2013/0075531 is recommended. Based on the present discussion, it can now be appreciated that the invention is not limited to the method of passing the information between the sensor groups 86, 92, 96, 100, 104, 110 and 116, and the WSH 88.

The windshield 117 was added to the AWSN 85 to illustrate a non-limiting embodiment of a wireless connection of the invention. The windshield 117 is not shown in the other non-limiting embodiments of the invention, however, it is understood that wireless connections can be used with other non-limiting embodiments of the invention. Further, unless indicated otherwise, the discussion directed one or more of the IAWs 10-13 is applicable to the IAW 117.

With continued reference to FIG. 3, the WSH 88 includes a microprocessor 130 to process the information received from sensor groups 86, 92, 96, 100 and 116, to determine the performance of properties of each of the windows of interest. In one non-limiting embodiment of the invention, the WSH 88 includes software and data to format the information from the sensors groups 86, 92, 96, 100 and 116 to present a representation of the performance of the AIWs 10-13 and 117. The invention is not limited to the formatting of the information received by the WSH 88, e.g. in one non-limiting embodiment of the invention, the data from the sensor groups 86, 92, 96, 100 and 116 received by the WSH 88 is formatted to show performance of the AIWs 10-13 and 117 in the categories of windows performing at the bottom quartile, the top quartile and the middle half of the acceptable range for each of the properties of the AIW being monitored. In another non-limiting embodiment of the invention, the formatting includes assigning windows to networks of windows, e.g. a network of side windshields, and a network of front windshields, and noting and comparing their performance.

As can be appreciated, the invention is not limited to a microprocessor and any equipment for processing information can be used in the practice of the invention, e.g. but not limited to a fully programmable gate array (also known in the art as "FPGA") and/or an application specific integrated circuit.

In one non-limiting embodiment of the invention, and as shown in FIG. 3, the WSH 88 can be an independent unit used to monitor and control the aircraft window system, or the WSH 88 can be connected to an aircraft central maintenance system 134 (hereinafter also referred to as "aircraft CMS 134") of the aircraft 15 by wire or cable 136, and/or wireless. The aircraft CMS 134 includes software and historical data to provide expected useable life of the windshields 10-13 and 117, through a mathematical framework and when necessary, set up repair or replacement of the aircraft intelligent window, e.g. but not limited to the procedure disclosed in U.S. Pat. No. 8,155,816. When the windshield sensing hub 88 is used with the aircraft CMS 134, the formatted information is forwarded from the WHS 88 to the aircraft CMS 134 of the aircraft by the cable 136. The aircraft CMS 134 acts on the formatted information to determine health and useable life of the AIW 10-13 and 117, e.g. as discussed in detail below.

As can now be appreciated, the invention is not limited to the number of windows connected to the window sensing hub 88, and all the windows of the aircraft 15 can be connected to the WSH 88. Further, the invention is not limited to the number of sensors provided on each of the AIW 10-13 and 117 of the aircraft 15.

An advantage of the aircraft window sensing network 85 shown in FIG. 3 is the capability of setting up the microprocessor 130 of the WSH 88 to format only data of interest and forwarding the formatted data of interest to the aircraft central monitoring system 134 to determine the health and useable life of the AIWs of interest, e.g. but not limited to windshields 10-13 and 117. The filtered data is stored for reference, e.g. but not limited to the invention to determine expected life expectance of the AIWs 10-13 and 117 as discussed below. By way of illustration and not limiting to the invention, the microprocessor 130 of the WSH 88 is programed based on a mathematical model to format the data of interest from the data collected on the activity of the aircraft. For example and not limiting to the discussion, If the plane is scheduled for takeoff, before takeoff, data from all the sensor groups 86, 92, 96, 100 and 116 of the aircraft windshields 10-13 and 117 is collected by the aircraft central maintenance system, or aircraft CMS 134 and evaluated by a model based microprocessor 130 to show performance of the aircraft intelligent windshields 12-13 and 117, and the resulting data sent to the aircraft CMS 134 to determine expected useable life of the AIWs 10-13 and 117. If the expected useable life of an AIW 12-13 and 117 is less than the flight time to the initial destination or less than a scheduled flight time to an airport having an AIW to replace the AIW of interest, the AIW of interest is replaced before takeoff.

In another non-limiting embodiment of the invention, during takeoff of the aircraft 15, the microprocessor 130 of the WSH 88 is programed to process data from the impact sensor and the crack sensor of the windshields 10-13 and 117, and to forward the data from the impact sensor and the crack sensor of the windshields to the aircraft CMS 134 to determine any change in the expected useable life of the AIWs 10-13 and 117.

In still another non-limiting embodiment of the invention, during flight time, the microprocessor 130 is programed to evaluate data from the sensors at a frequency based on its importance during the flight. For example and not limiting to the discussion, the temperature sensor and the arc sensor are checked at the highest frequency; the crack or rupture sensor and the moisture sensor are measured at a frequency less than the frequency check of the arc and temperature sensors, and the impact sensor is measured at a frequency less than the frequency check of the moisture sensor, and the crack sensor of the AIWs 10-13 and 117.

Further, in another non-limiting embodiment of the invention, during landing of the aircraft, the microprocessor 130 of the WSH 88 is programed to process data from the impact sensor and the crack sensor and to forward the data from the impact sensor and the crack sensor to the ACMS 134 to be part of the window history database and with a mathematical model to determine any change in the expected useable life of the AIWs 10-13 and 117.

The microprocessor 130 of the WSH 88 can also be programed to display immediately any sensor reading that has a drop in performance of a predetermined percent, e.g. but not limited to 25% or more drop in performance. Data collected and not used during take-off, flight and landing, is forwarded to a storage facility and used to determine life expectance as discussed below.

Figure 4:
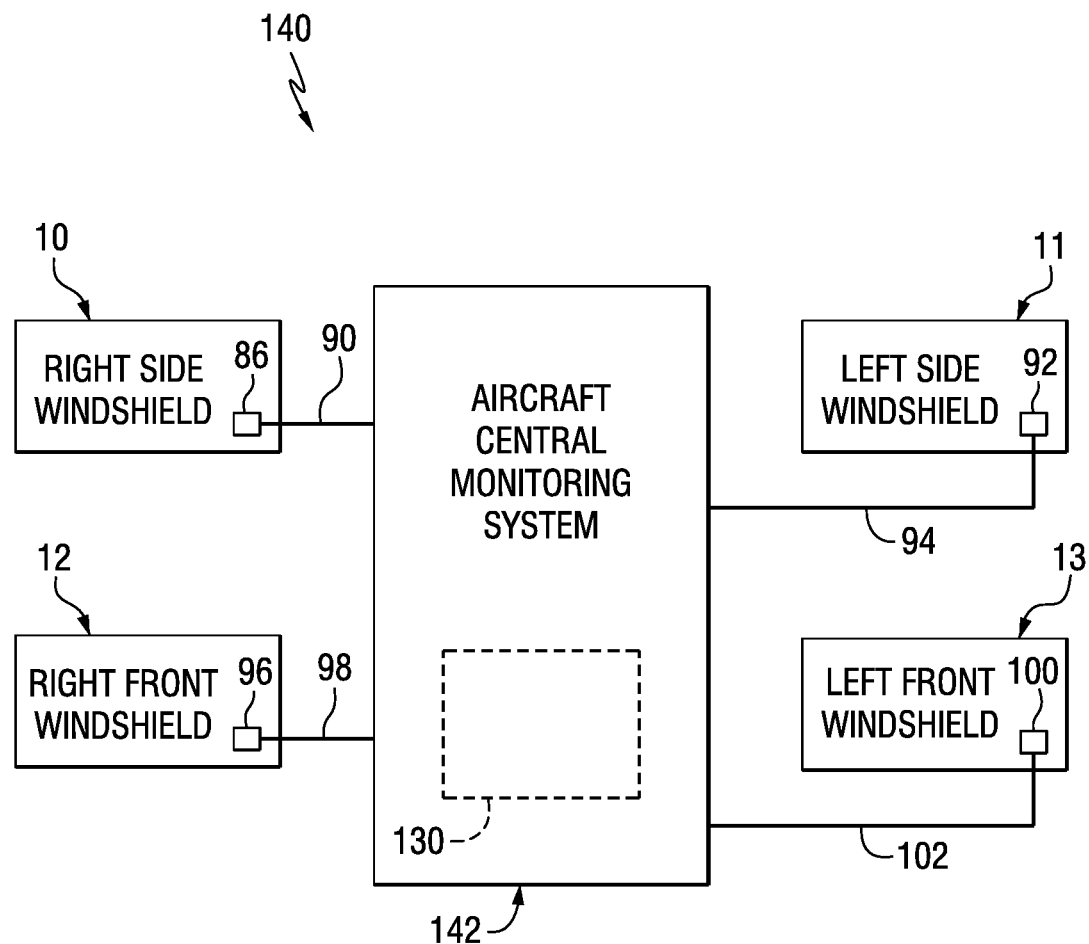
FIG. 4 is another non-limiting embodiment of a schematic of a network of aircraft intelligent windows of the invention.

Shown in FIG. 4 is another non-limited embodiment of an aircraft window sensing network of the invention identified by the number 140. The aircraft window sensing network 140 includes, but is not limited to, the windshields 10-13 having sensor groups 86, 92, 96, and 100, respectively, connected to aircraft central monitoring system 142 by the wires 90, 94, 98, and 102, respectively. In this non-limiting embodiment of the invention, the aircraft CMS 142 can include the formatting features of the WHS 88 e.g. but not limited to having the microprocessor 130 positioned in, or being part of, the aircraft CMS 142. The aircraft CMS 142 of the aircraft window-sensing network 140 shown in FIG. 4 operates in a similar manner as the WSH 88 and aircraft CMS 134 of the aircraft window sensing network 85 shown in FIG. 3.

Figure 5:
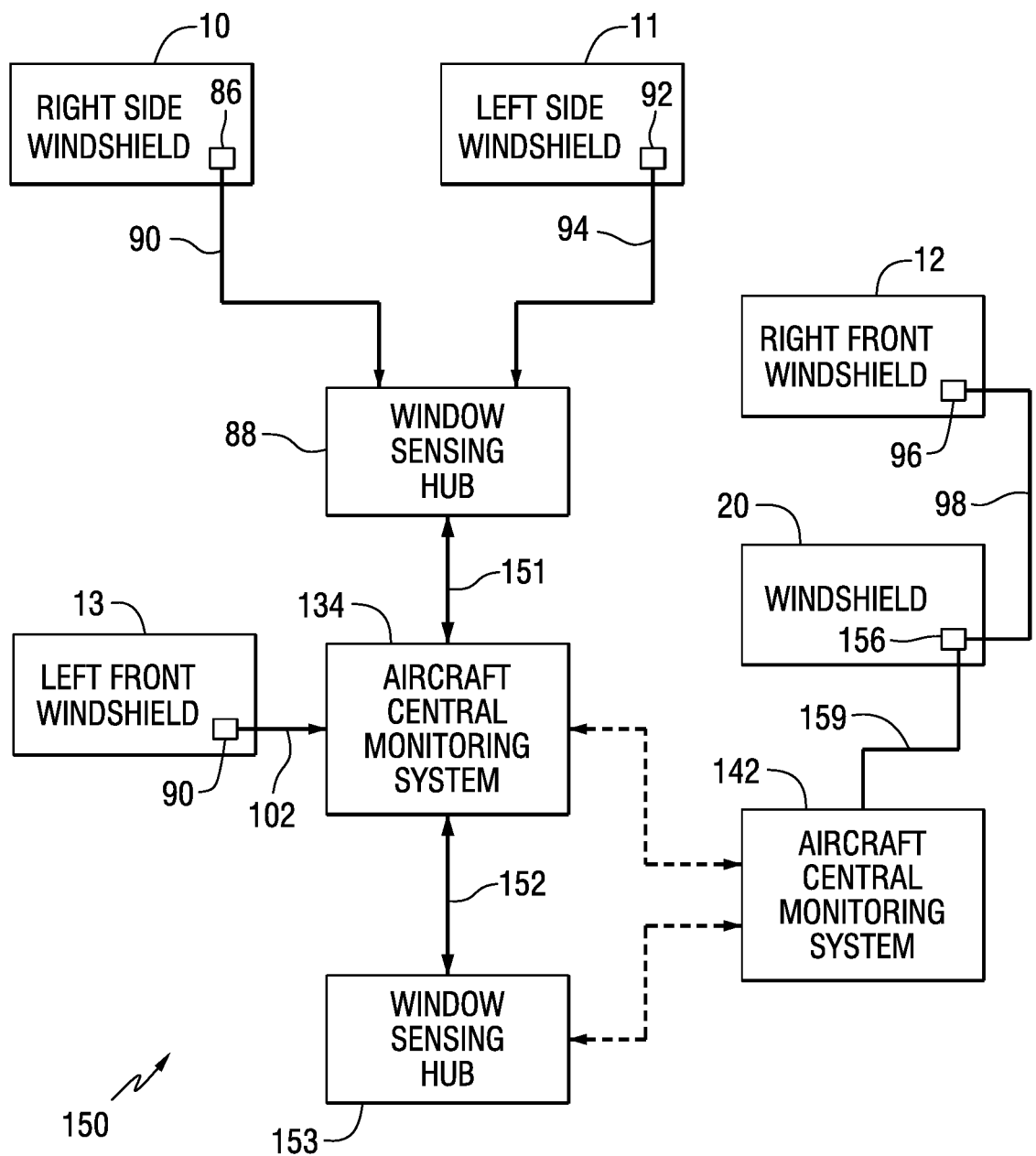
FIG. 5 is still another non-limiting embodiment of a schematic of a network of aircraft intelligent windows of the invention.

FIG. 5 shows still another non-limiting embodiment of an aircraft window-sensing network ("AWSN") of the invention designated by the number 150. In general, the aircraft window-sensing network 150 includes, but is not limited to, any combination of single or multiple units, including any or all of the IAW 10-13, and 20 (see FIGS. 1-4), the WSH 88 (see FIG. 3), and/or the aircraft CMS 134 (FIG. 3) and 142 (FIG. 4). In the non-limiting embodiment of the invention shown in FIG. 5, the aircraft window sensing network 150 includes, but is not limited to, the sensor group 86 of the right side window 10 and the sensor group 92 of the left side window 11 connected to the WSH 88 by wires 90 and 94, respectively. The sensor 92 of the left front window 13 is connected to the aircraft CMS 134 by cable 102, and the aircraft CMS 134 and the WSH 88 are connected by cable 151 to exchange information between the aircraft CMS 134 and the WSH 88 relating to performance of the windows, e.g. but not limited to aircraft history and maintenance of the aircraft intelligent windows 10, 11 and 13. The aircraft CMS 142 is connected by cable 152 to a window sensing HUB 153 to exchange information between the ACMS 142 and the window sensing hub 153 relating to performance of the windows 10, 11 and 13. With continued reference to FIG. 5, the sensor 96 of the windshield 12 is connected by wire 98 to sensor 156 of the window 20, and the sensors 98 and 156 are connected to an aircraft CMS 158 by cable 159. As can be appreciated, the information from the sensor 96 of the window 12 can be integrated with the information of the sensor 156 of the window 20 and forwarded to the aircraft CMS 142 by the cable 159, or the information from the sensor 96 of the window 12 can be forwarded by cable 98 to the window 20 and forwarded with the information from the sensor 156 by cable 159 to the aircraft CMS 142.

The AWSN 150 of FIG. 5 provides the option to compare the performance of the AIWs 10 and 11 to one another, and to compare the performance of the AIW 13 to the AIWs 10 and 11 as individual windows or as a group of windows, or to the combination of windows and to compare the performance of the AIW 12 and 20 to one another. Optionally and not limiting to the invention the aircraft CMS 142 can be connected to the aircraft CMS 134 and/or the window sensing hub 153 by wires 160 and 162, respectively (shown in phantom). In this manner, the performance of the windows can be compared to one another. For example and not limiting to the invention, the output of the arc sensor and temperature sensor for the windows 10, 11 and 13 can be compared to one another to see if the deterioration of the AIW follows a pattern or is random. If a failure pattern is followed, the failure of the AIW may be due to an effect acting on the window as contrasted to an effect of the window.

As can now be appreciated, the invention is not limited to the connections of the intelligent aircraft windows ("IAW") 10-13 as shown in FIGS. 3-5, and the invention contemplates any IAW connection configurations, e.g. but not limited to IAW directly or indirectly connected to the WSH or the aircraft CMS; IAW inter-connected to another IAW for information sharing or networking, and any combination of IAWs inter-connected first and then connected as a group to either AWH or integrated aircraft CMS. Further, connections of the intelligent aircraft windows 10-13 to the aircraft central maintenance systems 134 and 142 in FIGS. 3-5, respectively, and the invention contemplates any individual IAW directly integrated into the aircraft CMS to be part of the aircraft maintenance and aircraft reliability calculation/predictions, any combination of IAWs can be inter-connected and/or grouped together and then connected to the aircraft CMS as part of the aircraft history and maintenance recording system, and the Window Sensing Hub (WSH) integrated into the aircraft CMS as part of the CMS for the aircraft monitoring system.

As discussed above, any ACMS integration from AIW system to aircraft CMS can be made either by wired connection or wireless connection when acceptable. In the practice of the invention, every AIW can be independently used to shutdown the window heat controller as disclosed in U.S. Published Patent Application Serial No. 2013/075,531 or other window related controllers as disclosed in U.S. Patent Application Publication No 2010/0163675 A1. The invention is not limited to reasons to shut down the sensors of the intelligent aircraft windows 10-13 and 20 (shown only in FIG. 5, and the windows can be shut down for any reason including, but not limited to, a window operating outside of an acceptable range for the property being monitored, or the sensor of the window is not needed because the property being monitored is not active, e.g. a sensor for impact monitoring can be needed on takeoff but may not necessarily be needed when the aircraft is in flight.

The non-limited embodiments of the invention provide, among other things, the opportunity to make an intelligent decision for the aircraft control actions, such as shutdown the intelligent aircraft window heat controller, alarm the pilot, data input to the aircraft ACMS based on the window conditions, such as, the window life prediction, window longevity, window arcing condition, window moisture ingression, window impact status, and other window related measurement, will be instituted either by the aircraft ACMS system, by WSH with connection to the aircraft control system input/output modules system, or individually in any AIW with direct or indirect connection to the aircraft control system input/output modules system.

The discussion is now directed to the use of the networks to monitor the performance of the windows having the sensors. The network shown in FIG. 3 uses the WSH as a filter to take all of the information and data provided by the sensor groups to study those properties of interest for the activity of the aircraft. By way of illustration and not limiting to the invention, during takeoff the information from the impact sensors is monitored to identify any impact having force sufficient to cause a sheet of the windshield to fracture. After takeoff the output of the crack sensor and the impact sensor are saved into the WSH and evaluated by a math model to determine if a reading is outside of normal low impact. With the plane in flight the monitoring of the impact sensor is reduced to read impact data only if a reading is outside of an acceptable range.

Consider the arcing sensor and the temperature sensor. For planes flying in high temperature zones, the heatable member may have limited use. More particularly, the data from the temperature sensor and the arc sensor can be taken for historical purposes and not processed because the heatable member may be turned off. As can now be appreciated, the output of the arc sensor and the temperature sensor is only used when the data indicates that the heatable member is arcing and/or the temperature sensor indicates a temperature outside an acceptable range.

Figure 6:
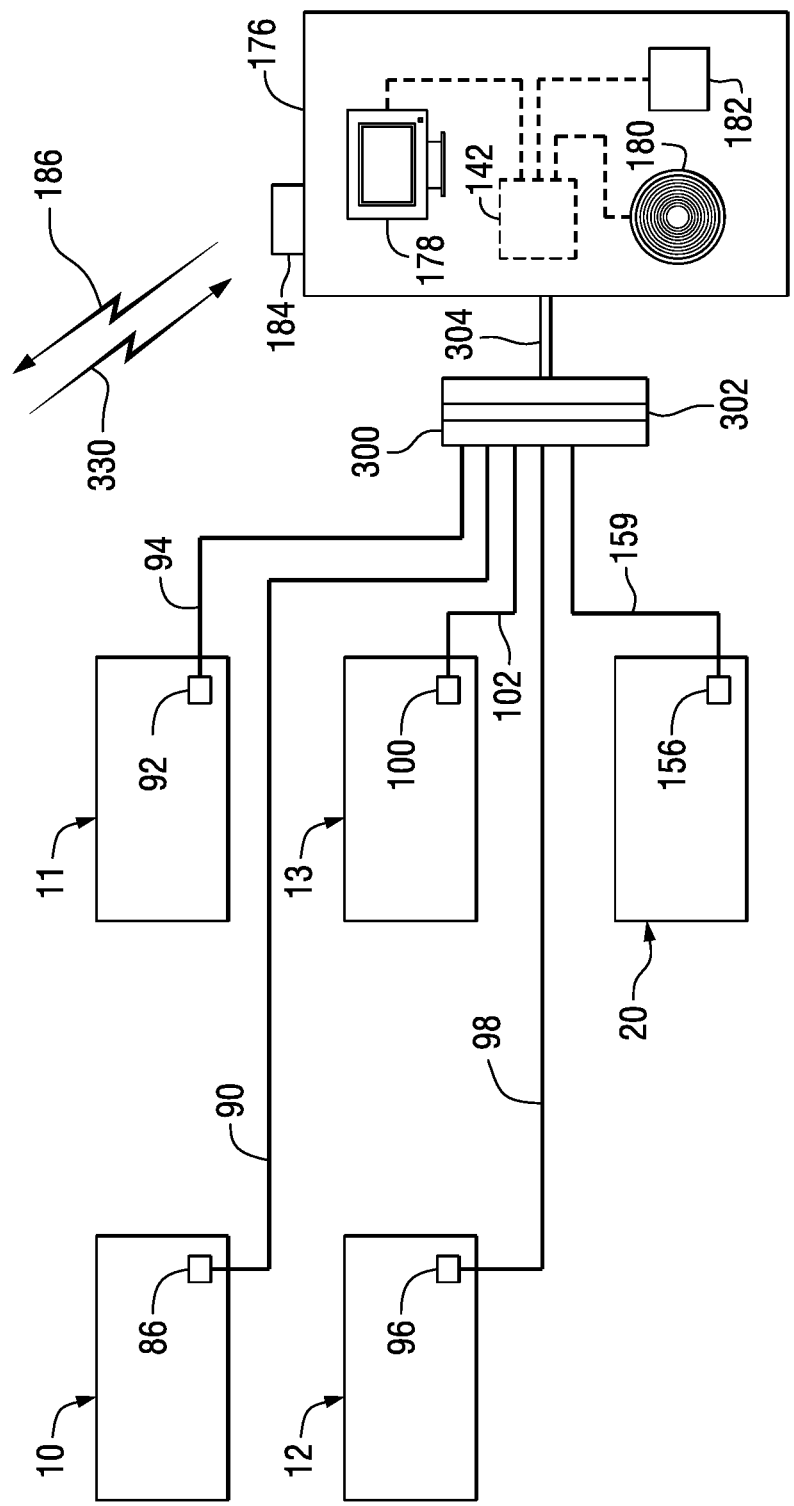
FIG. 6 is a schematic of a system of the invention for monitoring the output signals of sensors or detectors of the aircraft intelligent windows in accordance to the teachings of the invention.

As can be appreciated, the invention is not limited to the software program to evaluate the performance of the windshield, and to determine and/or estimate useable life of the windshields, and any of the types known and/or used in the art can be used in the practice of the invention Control System With reference to FIG. 6, there is shown one non-limiting embodiment of the invention to monitor the performance of the AIW 10-13 and 20 shown in FIG. 5 of the invention and to timely schedule maintenance of, e.g. repairs to, or replacement of, transparencies, e.g. AIWs that are performing outside acceptable limits and/or have a short life expectance. The sensor groups 86, 92, 96, and 100, of the IAWs 10-13 of the network 140 shown in FIG. 4 are connected by wires 90, 94, 98, and 102, respectively to the aircraft CMS 142, mounted in a console 176 mounted in the airplane 15 (FIG. 1). The aircraft CMS 142 is connected to a monitor 178 to provide visual display, and speaker 180 to provide audible information regarding the performance of the AIWs 10-13. The console 176 can include an alarm 182 to bring attention to the monitor 178. Placing the console 176 in the aircraft 15 provides the personnel within the aircraft 15 with real time performance of the AIW 10-13

Figure 7:
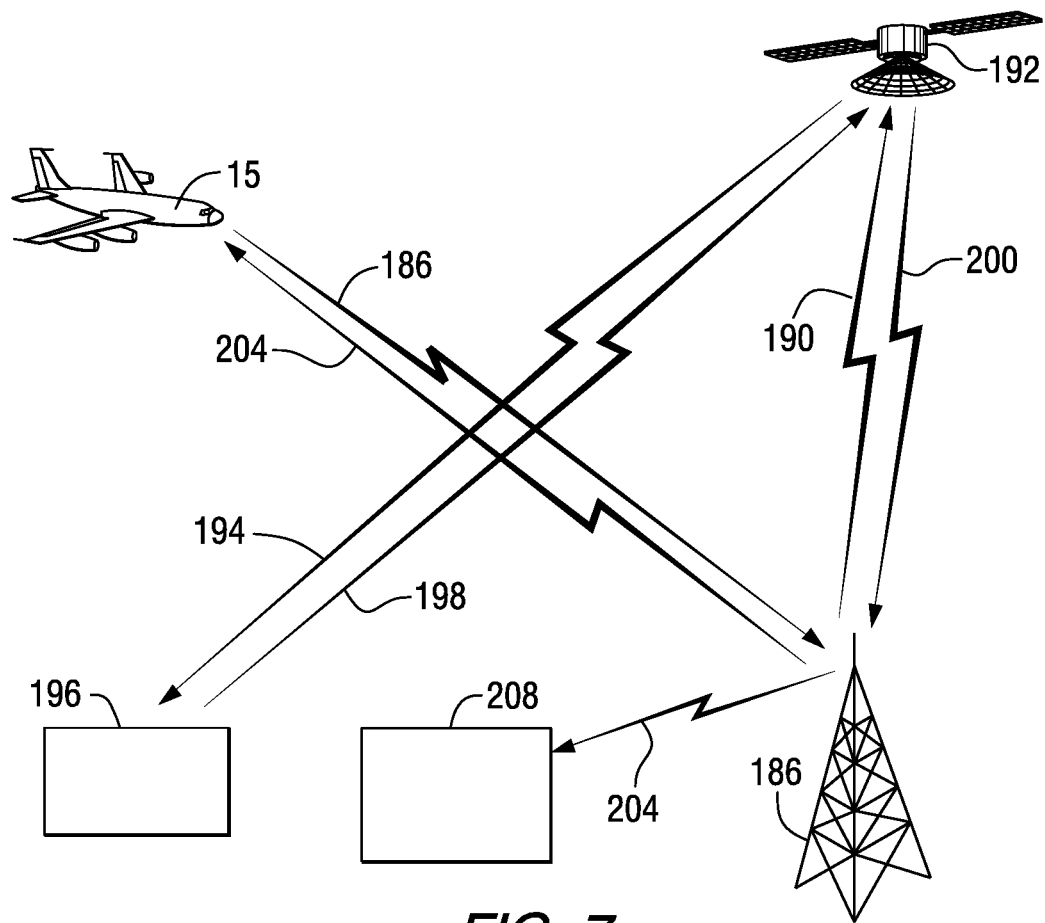
FIG. 7 is a schematic of a system for scheduling repairs to, or replacements of, aircraft intelligent windows that are performing outside of acceptable limits.

With reference to FIGS. 6 and 7, in another non-limiting embodiment of the invention, the console 176 has a wireless transmitter and receiver 184; the transmitter 184 transmits signals 186 to a transmitting tower 188. The signals 186 carry data on the performance of the AIWs 10-13. The tower 188 transmits a signal 190 carrying the data on the performance of the AIW 10-13 to a satellite 192. The satellite 192 transmits a signal 194 carrying the data on the performance of the AIWs 10-136 to a control center 196. The data received is studied and the appropriate action to be taken is scheduled. In one non-limiting embodiment of the invention, based on the information received, personnel at the control center 196 determine what action, if any, is needed. If action such as repairs to the AIW or replacement of the AIW is needed, a signal 198 providing a repair schedule is transmitted to the satellite 192. The satellite 192 transmits a signal 200 having the repair schedule to the tower 188. The tower 188 transmits a signal 204 having the repair schedule to the console 176 and to a maintenance center 208 geographically close to the designated repair location (usually the next scheduled stop for the aircraft) to arrange to have all parts, equipment and personal need at the designated repair location.

In still another non-limiting embodiment of the invention, if the data from the sensor groups indicate that an AIW has to be replaced, the repair schedule can include shipment of an AIW replacement windshield to the next scheduled stop of the aircraft; if the AIW has to be replaced with some urgency, the repair schedule would include a change to the flight plan to land immediately and an AIW scheduled to be delivered to the repair area. The passengers can optionally be transferred to another plane or wait until the repair is completed. If a repair is scheduled, and the repair can be made without removing the unacceptable AIW, the repair schedule can provide for personnel and repair parts to be provided at the designated repair location.

As can be appreciated, the invention is not limited to wireless transmission of signals carrying information and the transmission can be made by land-lines. Further, the signals can be transmitted between locations solely by satellite, or solely by transmission towers, and by combinations thereof.

The invention is not limited to the embodiments of the invention presented and discussed above which are presented for illustration purposes only, and the scope of the invention is only limited by the scope of the following claims and any additional claims that are added to applications having direct or indirect linage to this application.

What is claimed is:

1. An intelligent window system, comprising:
   a plurality of transparencies of a vehicle mounted to different locations of the vehicle, each transparency comprising at least one sensor group configured to measure predetermined characteristics or properties of the transparency, wherein the at least one sensor group comprises at least one of an arc sensor, a temperature sensor, a moisture sensor, an impact sensor, or a fracture sensor; and
   a central monitoring system electrically connected to the sensor groups, the central monitoring system comprising a processor comprising a preset program comprising instructions that when executed by the processor causes the processor to:
      receive data obtained over at least one time period directly or indirectly from the at least one sensor of the at least one sensor group of each of the plurality of transparencies; and
      provide an estimated remaining useable life for a selected transparency of the plurality of transparencies, wherein the estimated remaining useable life for the selected transparency is based, at least in part, on (i) received data for the selected transparency showing present performance of the selected transparency, (ii) previous output data from the at least one sensor of the at least one sensor group of the selected transparency, and (iii) an activity of the vehicle when the previous output data was collected.

2. The system of claim 1, wherein the vehicle comprises one or more of a land vehicle, an air vehicle, a space vehicle, or a water vessel.

3. The system of claim 1, wherein the vehicle comprises an aircraft, and wherein the plurality of transparencies comprise one or more of cabin windows of the aircraft and windshields of the aircraft.

4. The system of claim 1, wherein the vehicle comprises an aircraft, and wherein the plurality of transparencies comprise windshields of the aircraft.

5. The system of claim 4, wherein the windshields of the aircraft comprise:
   a left side windshield;
   a right side windshield;
   a low right front windshield:
   a low left front windshield;
   a high right front windshield;
   a high left front windshield; and
   a middle front windshield between the high right front windshield and the high left front windshield.

6. The system of claim 1, wherein the at least one sensor group of the others of the plurality of transparencies measures the same predetermined characteristics or properties as the at least one sensor group of the selected transparency of the plurality of transparencies.

7. The system of claim 1, wherein the vehicle comprises an aircraft, and wherein the activity of the vehicle when the previous output data was collected comprises before takeoff activities of the aircraft, takeoff of the aircraft, flight of the aircraft, landing of the aircraft, or after landing activities of the aircraft.

8. The system of claim 1, wherein the estimated remaining usable life is further based on the received data from the at least one sensor group of others of the plurality of transparencies located at different locations of the vehicle than the selected transparency showing present performance of the other transparencies.

9. The system of claim 8, wherein the estimated remaining useable life for the selected transparency is based, at least on in part, on a comparison between received data for the selected transparency showing present performance of the selected transparency and the received data from the at least one sensor group of others of the plurality of transparencies located at different locations of the vehicle than the selected transparency showing present performance of the other transparencies.

10. The system of claim 1, wherein the preset program causes the processor to adjust a sampling frequency for data obtained from the at least one sensor group of the selected transparency based on the received data from the at least one sensor group of others of the plurality of transparencies.

11. The system of claim 1, wherein the instructions, when executed by the processor, cause the processor to schedule repair and replacement of the selected transparency of the plurality of transparencies based on the estimated remaining useable life of the selected transparency.

12. The system of claim 1, wherein the instructions, when executed by the processor, cause the processor to provide an indication when the estimated remaining useable life of the selected transparency is less than a transit time to an initial destination of the vehicle.

13. The system of claim 1, further comprising at least one window sensing hub electrically connected to the at least one sensor group of the plurality of transparencies and to the central monitoring system, the at least one window sensing hub comprising at least one processor configured to:
   receive sensor data from the at least one sensor group of the plurality of transparencies,
   process the received data to generate formatted data of interest for the sensors of the at least one sensor group of each of the plurality of transparencies, and
   transmit the formatted data of interest to the central monitoring system, wherein the data received by the central monitoring system comprises the formatted data of interest generated by the window sensing hub.

14. The system of claim 13, wherein the at least one processor of the window sensing hub is further configured to receive information about the activity of the vehicle during the at least one time period, and wherein processing the received sensor data to generate the formatted data of interest comprises filtering the received data based on the activity of the vehicle as the data is collected.

15. The system of claim 14, wherein the vehicle comprises an aircraft and wherein the activity of the vehicle comprises before take-off activities, during flight activities, landing of the aircraft, or after landing activities.

16. The system of claim 15, wherein the at least one processor of the window sensing hub filters the received sensor data so that the formatted data of interest includes only data collected during take-off and/or landing of the aircraft.

17. The system of claim 15, wherein the at least one processor of the window sensing hub filters the received data so that the formatted data of interest excludes data collected by the at least one sensor group during flight activities or after landing activities.

18. The system of claim 14, wherein filtering the received data is further based on a type of sensor that collected the sensor data.

19. The system of claim 1, wherein the arc sensor measures arcing of an electrically heatable member of the transparency, the temperature sensor measures temperature of at least a portion of the transparency, the moisture sensor measures moisture between laminated sheets of the transparency, the impact sensor measures force of impact of objects hitting an outer surface of the transparency, or the fracture sensor identifies fractures in the transparency.

* * * * *